(12) United States Patent
Burhenne et al.

(10) Patent No.: US 6,988,491 B2
(45) Date of Patent: Jan. 24, 2006

(54) PUMP UNIT ARRANGED IN AN INNER TANK OF A FUEL TANK OF A MOTOR VEHICLE

(75) Inventors: Sabine Burhenne, Bretten (DE); Johannes Deichmann, Alheim-Sterkelshausen (DE); Joerg Deubner, Bebra (DE); Peter Marx, Wasbuettel (DE); Hans-Peter Osburg, Bargteheide (DE)

(73) Assignee: Siemens Aktiengesellschaft, (DE)

( * ) Notice: Subject to any disclaimer, the term of this patent is extended or adjusted under 35 U.S.C. 154(b) by 0 days.

(21) Appl. No.: 10/484,003

(22) PCT Filed: Jul. 12, 2002

(86) PCT No.: PCT/DE02/02562

§ 371 (c)(1),
(2), (4) Date: Jan. 15, 2004

(87) PCT Pub. No.: WO03/016084

PCT Pub. Date: Feb. 27, 2003

(65) Prior Publication Data

US 2004/0211396 A1   Oct. 28, 2004

(30) Foreign Application Priority Data

Aug. 14, 2001 (DE) ................ 101 38 838

(51) Int. Cl.
*F02M 37/04* (2006.01)

(52) U.S. Cl. ..................... 123/509; 123/514
(58) Field of Classification Search .......... 123/509, 123/514, 516, 456, 495
See application file for complete search history.

(56) References Cited

U.S. PATENT DOCUMENTS

| 4,860,714 | A |   | 8/1989  | Bucci |            |
|-----------|---|---|---------|-------|------------|
| 5,070,849 | A | * | 12/1991 | Rich et al. | 123/509 |
| 5,139,000 | A | * | 8/1992  | Sawert | 123/514 |
| 5,218,942 | A | * | 6/1993  | Coha et al. | 123/514 |

(Continued)

FOREIGN PATENT DOCUMENTS

DE   41 11 341 A1   10/1992

(Continued)

*Primary Examiner*—Carl S. Miller
(74) *Attorney, Agent, or Firm*—Richard A. Speer; Mayer, Brown, Rowe & Maw LLP

(57) ABSTRACT

The invention relates to a pump unit arranged in an inner tank (3) of a fuel tank, comprising a fuel pump (5) which is used to pump fuel to the internal combustion engine of a motor vehicle; an ejector pump (21) which is connected to the fuel pump (5) and used to pump fuel out of the fuel tank into the inner tank (3); and at least one filter element (20;31) which is used to filter fuel, wherein a housing part which is connected to the fuel pump (5) is provided with at least one channel (30;33;35;47) for guiding said fuel. In order to simplify the structure of the pump unit (2) and to enable substantial pre-assembly, the housing part (24;40) is configured in such a way that it can hold the at least one filter element (20;31), and the channel (30;33;35;47) is exclusively guided inside the housing part (24; 40) from the ejector pump (21) and/or the fuel pump (5) to the filter element (20;31).

2 Claims, 2 Drawing Sheets

U.S. PATENT DOCUMENTS

Figure 3:
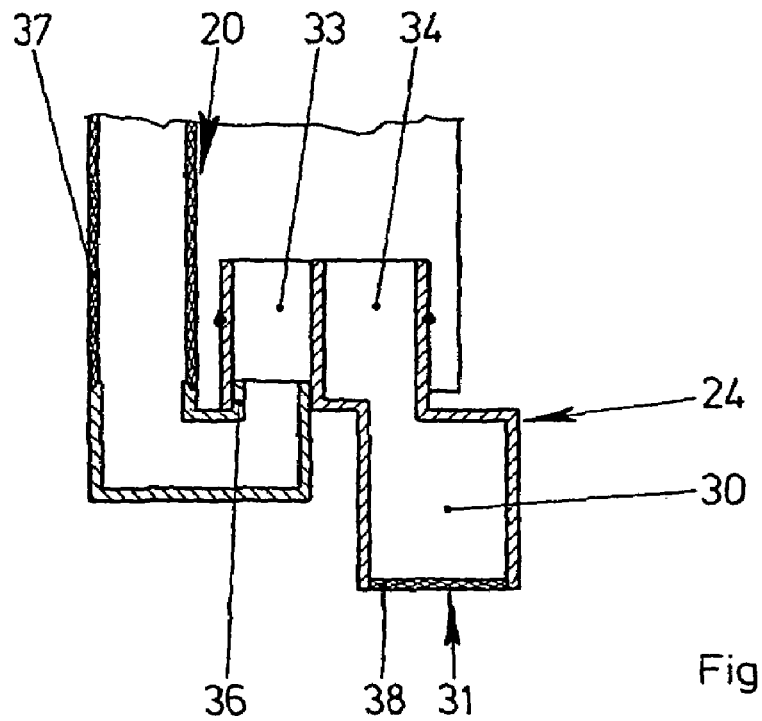

| | | | |
|---|---|---|---|
| 5,263,459 A | 11/1993 | Talaski | |
| 5,699,773 A | 12/1997 | Kleppner et al. | |
| 5,797,373 A * | 8/1998 | Kleppner et al. | 123/495 |
| 5,960,775 A * | 10/1999 | Tuckey | 123/509 |
| 6,425,378 B1 * | 7/2002 | Frank | 123/514 |
| 6,619,272 B2 * | 9/2003 | Jones et al. | 123/514 |
| 6,679,226 B2 * | 1/2004 | Burke et al. | 123/509 |

FOREIGN PATENT DOCUMENTS

| | | |
|---|---|---|
| DE | 195 04 217 A1 | 8/1996 |
| DE | 43 36 276 C2 | 8/1997 |
| DE | 198 43 318 A1 | 5/2000 |
| DE | 195 18 755 C2 | 9/2000 |
| DE | 100 55 344 A1 | 5/2001 |

* cited by examiner

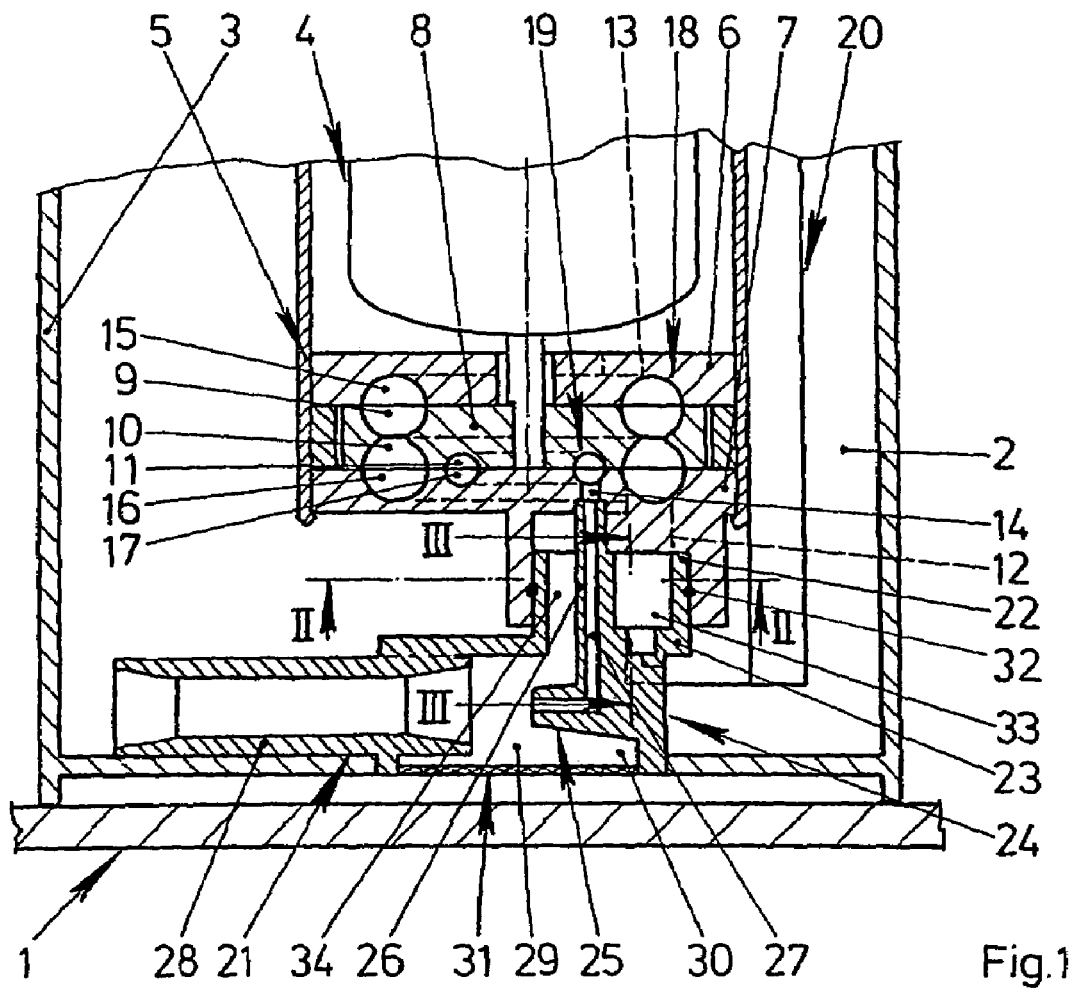
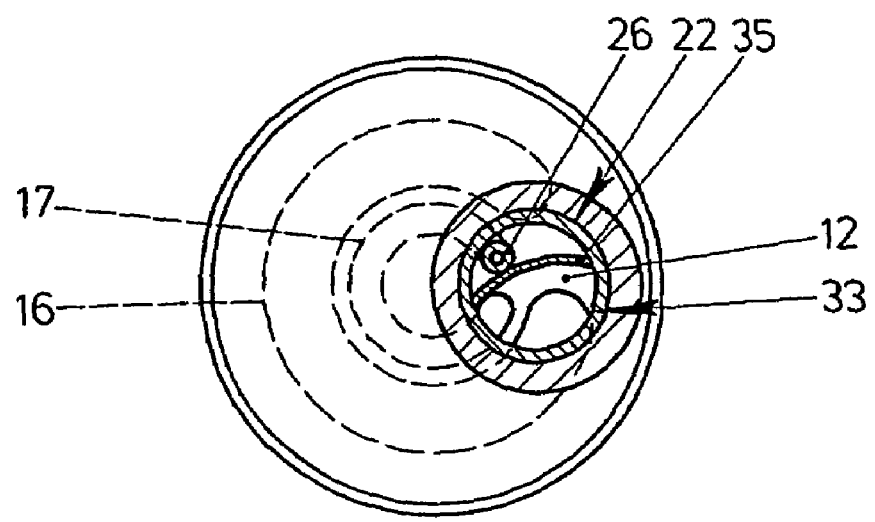

PUMP UNIT ARRANGED IN AN INNER TANK OF A FUEL TANK OF A MOTOR VEHICLE

BACKGROUND OF THE INVENTION

The invention relates to a pump unit which is to be arranged in a surge chamber of a fuel tank of a motor vehicle, having a fuel pump which is provided for pumping fuel to an internal combustion engine of the motor vehicle, having an ejector pump which is connected to the fuel pump and is used to pump fuel out of the fuel tank into the surge chamber, and having at least one filter element for filtering fuel, a housing part which is connected to the fuel pump having at least one channel which is provided for guiding the fuel.

Pump units of this type are frequently used in motor vehicles today and are known from practice. The housing part of the known pump unit has a flange with which it is inserted into a recess of the surge chamber and is sealed with respect to the latter. The channel leading to the intake side of the ejector pump is guided as far as the flange. The filter element is fastened on the lower side of the surge chamber and has an edge with which it is sealed with respect to the surge chamber.

A disadvantage of the known pump unit is that it is of very complex construction and pre-assembly to form individual subassemblies which can be combined with one another is not possible.

The invention is based on the problem of designing a pump unit of the type mentioned at the beginning in such a manner that it is of particularly simple construction and enables substantial pre-assembly.

BRIEF DESCRIPTION OF THE INVENTION

This problem is solved according to the invention in that the housing part is designed to hold the at least one filter element, and the channel is guided from the ejector pump and/or from the fuel pump to the filter element exclusively within the housing part.

This design enables the pump unit according to the invention to be pre-assembled with the filter element and the housing part outside the fuel tank and the surge chamber and then to be fitted in the surge chamber as a pre-assembled unit. Since the channel leading to the filter element is arranged exclusively within the housing part, multiple seals between the housing part and the filter element are avoided. The pump unit according to the invention thereby requires a particularly small number of components. The pump unit according to the invention is therefore of particularly simple construction and can be manufactured particularly cost-effectively.

A contribution is made to further reducing the number of components of the pump unit according to the invention if the ejector pump is manufactured as a single part with the housing part.

The ejector pump could be connected to the fuel pump via a hose line, for example. A contribution is made to further cutting down the assembly of the pump unit according to the invention if the housing part has a channel for a working-fluid line of the ejector pump.

Separate manufacturing of the ejector pump and housing part is generally required if the pump unit is provided for different surge chambers and fuel tanks. The pre-assembly of the pump unit according to the invention becomes particularly simple during the separate manufacturing of the housing part if the housing part contains the ejector pump or has a holder for the ejector pump or of a subregion of the ejector pump.

According to another advantageous development of the invention, the connection of the housing part to the fuel pump is highly stable if the housing part has an annular flange which is prestressed against the fuel pump. Furthermore, the housing part thereby requires a particularly small amount of material to be used.

The housing part could, for example, be rolled together with a housing part, which is manufactured from sheet metal, of the fuel pump. However, according to another advantageous development of the invention, the assembly and the removal of the housing part become particularly simple if the housing part has a plug-in connection on the fuel pump.

[lacuna] inlet and outlet regions arranged very close to one another. However, in order to avoid flow losses, the inlet regions generally have to be very large. The pump unit according to the invention has very low flow losses and turns out to be particularly compact if the channel of the working-fluid line of the ejector pump has a pipe length which is guided to the fuel pump through a connecting branch which has the inlet region.

In particular if housing parts are manufactured from plastic, the pump unit according to the invention requires particularly few components to be fitted if the filter element is manufactured integrally with the housing part. This design enables the filter element to be designed, for example, in the form of a perforation on a wall of the housing part.

Figure 4:
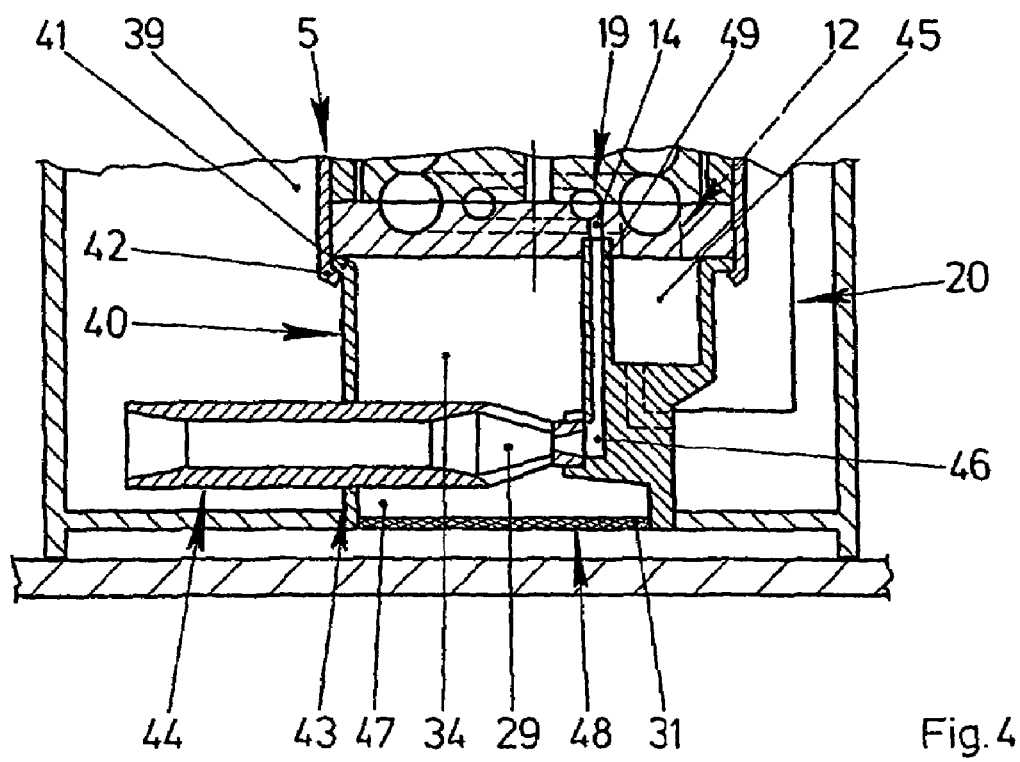

The invention permits numerous embodiments. To further clarify its basic principle, two of these are illustrated in the drawing and will be described below. In the drawing FIG. 1 shows a lower subregion of a pump unit according to the invention together with adjacent components of a fuel tank, in a partial section, FIG. 2 shows a sectional illustration through the pump unit from FIG. 1 along the line II—II, FIG. 3 shows a housing part of the pump unit according to the invention from FIG. 1 in an enlarged sectional illustration along the line III—III, FIG. 4 shows a lower subregion of a further variant of the pump unit according to the invention, in a partial section.

DETAILED DESCRIPTION OF THE INVENTION

FIG. 1 shows a bottom region of a fuel tank 1 of a motor vehicle with a pump unit 2 inserted therein. The pump unit 2 comprises a surge chamber 3 with a fuel pump 5 which is driven by an electric motor 4. The fuel pump 5 has an impeller 8 which is arranged between two fixed housing parts 6, 7 and can be driven by the electric motor 4. Two rings of vane chambers 9–11 are arranged in the impeller 8. In the region of the vane chambers 9–11, the housing parts 6, 7 have partially annular channels 15–17 which extend in each case from an inlet region 12 to an outlet region 13, 14. The partially annular channels 15–17 form with the vane chambers 9–11 pump chambers 18, 19 for pumping the fuel. Since radially outer vane chambers 9, 10 which lie opposite each other merge into one another, the flow passes axially through the impeller 8 in this region. The fuel pump 5 is therefore designed as a side-channel pump. During rotation of the impeller 8, fuel is sucked out of the surge chamber 3 via a filter element 20. The fuel is guided through the radially outer pump chamber 18 by the pump unit 2 to an internal combustion engine (not illustrated) of the motor vehicle. The radially inner pump chamber 19 is used to pump fuel as working fluid to an ejector pump 21. The ejector pump 21 sucks up fuel via an opening in the bottom of the surge chamber 3 and pumps it into the surge chamber 3.

The ejector pump 21 and connecting components 22, 23 leading to the filter element 20 and the fuel pump 5 are manufactured as a common housing part 24. Furthermore, the common housing part 24 has a pipe length 26 with a channel 27 which is guided from the radially inner pump chamber 19 to a nozzle 25 of the ejector pump 21. The housing part 24 also has a channel 30 which is guided as far as an inlet region 29 of the ejector pump 21, which region is arranged between the nozzle 25 and a mixing pipe 28. The channel 30 is guided through the bottom of the surge chamber 2. A filter element 31 is arranged at that end of the channel 30 which faces the fuel tank 1. This filter element 31 is manufactured integrally with the housing part 24. The connecting component 22 of the housing part 24 is sealed with respect to the lower housing part 7 of the fuel pump 5 by means of an O-ring 32, and can be plugged into said housing part. Furthermore, the housing part 24 has a channel 33 which is guided from the filter element 20, which is arranged in the surge chamber 3, as far as the inlet region 12 of the pump chambers 18, 19. A collecting space 34 for fuel which is to be sucked up is situated above the inlet region 29 of the ejector pump 21.

FIG. 2 shows that the connecting component 22 has a partition 35 to separate off the channel 33 of the inlet region 12 of the pump chambers from the collecting space 34. The pipe length 26 which is guided to the nozzle 25 (illustrated in FIG. 1) of the ejector pump 21 is guided through the collecting space 34. This design makes it possible for the radially inner, partially annular channel 17 to extend over a particularly large angular region. The radially outer, partially annular channel 16 ends shortly before the inlet region 12 of the fuel pump 5.

FIG. 3 shows the housing part 24, which has the channels 27, 30, 33, from FIG. 1 in a sectional illustration along the line III—III. It can be seen here that the filter element 20 which is arranged within the surge chamber 3 has a connecting stub 36 which is plugged into the channel 33 of the housing part 24 and a filter cloth 37 which is fastened to the connecting stub 36. The housing part 24 can therefore be pre-assembled together with the filter element 20 to form a constructional unit and can then be connected to the fuel pump 5 from FIG. 1. The filter element 31 protruding into the fuel tank has a filter cloth 38 manufactured as a single piece with the housing part 24, and therefore forms a constructional unit with the housing part 24.

FIG. 4 shows a pump unit 39, in which a housing part 40 which is fastened to the fuel pump 5 has a flange 41. This flange 41 is gripped from behind by a crimped sheet-metal edge 42 of the fuel pump 5. Furthermore, the housing part 40 has a holder 43 to plug an integrally manufactured ejector pump 44 into. As an alternative to the integral manufacturing of the ejector pump, the housing part 40 may also have a holder (not illustrated) for a subregion of the ejector pump. The housing part 40 has a channel 45 for connecting the inlet region 12 of the fuel pump 5 to the filter element 20, which is arranged within the surge chamber, a channel 46 for connecting the ejector pump 44 to the outlet region 14 of the radially inner pump chamber 19, and a channel 47 for connecting the inlet region 29 of the ejector pump to the filter element 31, which is arranged in the fuel tank 1. The housing part 40 has a collecting space 34 for fuel which is to be sucked up by the ejector pump 44 and a pipe length 49 for accommodating the channel 46. Otherwise, the housing part 40 can be designed in the same manner as the housing part 24 of the pump unit 2 from FIG. 1.

What is claimed is:

1. A pump unit which is to be arranged in a surge chamber contained within the fuel tank of a motor vehicle, the unit comprising:
   (a) a motor driven fuel pump having separate vane chambers which are located radially inwardly and radially outwardly with respect to each other;
   (b) a unitary housing part connected to the fuel pump, the housing having:
      (i) an inlet region for directing fuel from the surge chamber into the fuel pump radially outwardly located vane chambers;
      (ii) an ejector pump;
      (iii) a pipe length connecting the radially inward vane chambers to the ejector pump, whereby the ejector pump draws fuel from the tank into the surge chamber, the pipe length extending through a connecting branch which has the inlet region; and
      (iv) structure including a filter element for directing filtered fuel from the fuel tank into the ejector pump.

2. A pump unit as defined in claim 1, wherein the fuel pump has a connecting region and a channel extending through the connecting region which connects the fuel pump to the inlet region.

* * * * *